March 6, 1928.

W. E. McMURRAY

GRINDING PAN

Filed April 14, 1927

WITNESS
Oliver W. Holmes

INVENTOR
WALTER E. McMURRAY
BY
Knight Bros
ATTORNEYS

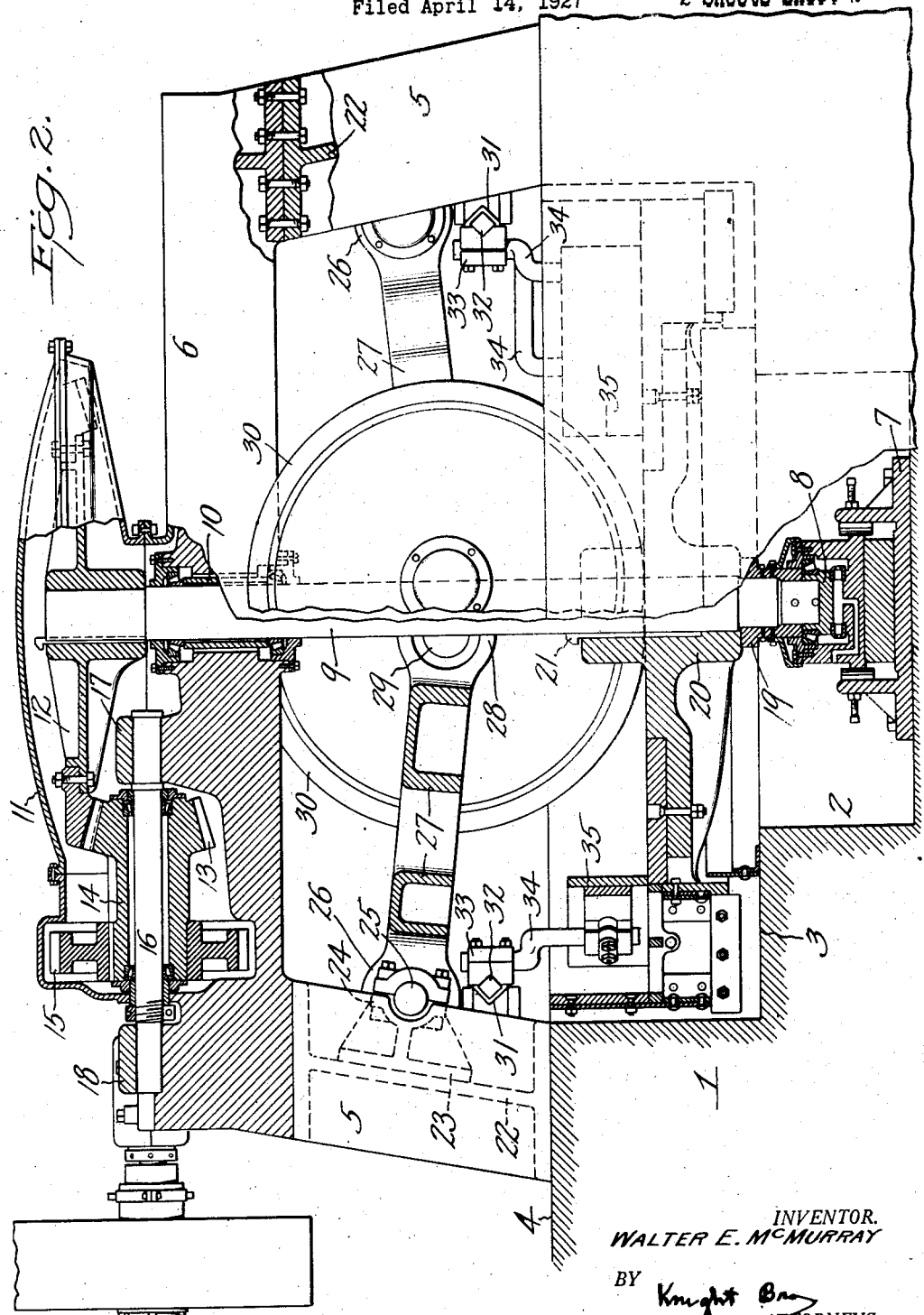

Patented Mar. 6, 1928.

1,661,297

UNITED STATES PATENT OFFICE.

WALTER EARL McMURRAY, OF CLEARFIELD, PENNSYLVANIA, ASSIGNOR TO CLEARFIELD MACHINE COMPANY, OF CLEARFIELD, PENNSYLVANIA, A CORPORATION OF PENNSYLVANIA.

GRINDING PAN.

Application filed April 14, 1927. Serial No. 183,778.

This invention relates to grinding pans and has for its object to provide an improved construction and arrangement of parts in a machine of this character with a view to facilitating the assembly, repair and replacement of said parts; to adapt said parts to perform their functions in an improved manner; to provide a machine which will be durable under service requirements and which can be operated more economically.

Toward the attainment of this purpose, my invention contemplates certain specific objects of invention which will appear in specification and be pointed out in the appended claims, reference being had to the accompanying drawings which exemplify my invention in a preferred embodiment.

In the drawings:

Figure 2 is an irregular vertical section corresponding to the line 2—2, of Figure 1.

Figure 1:
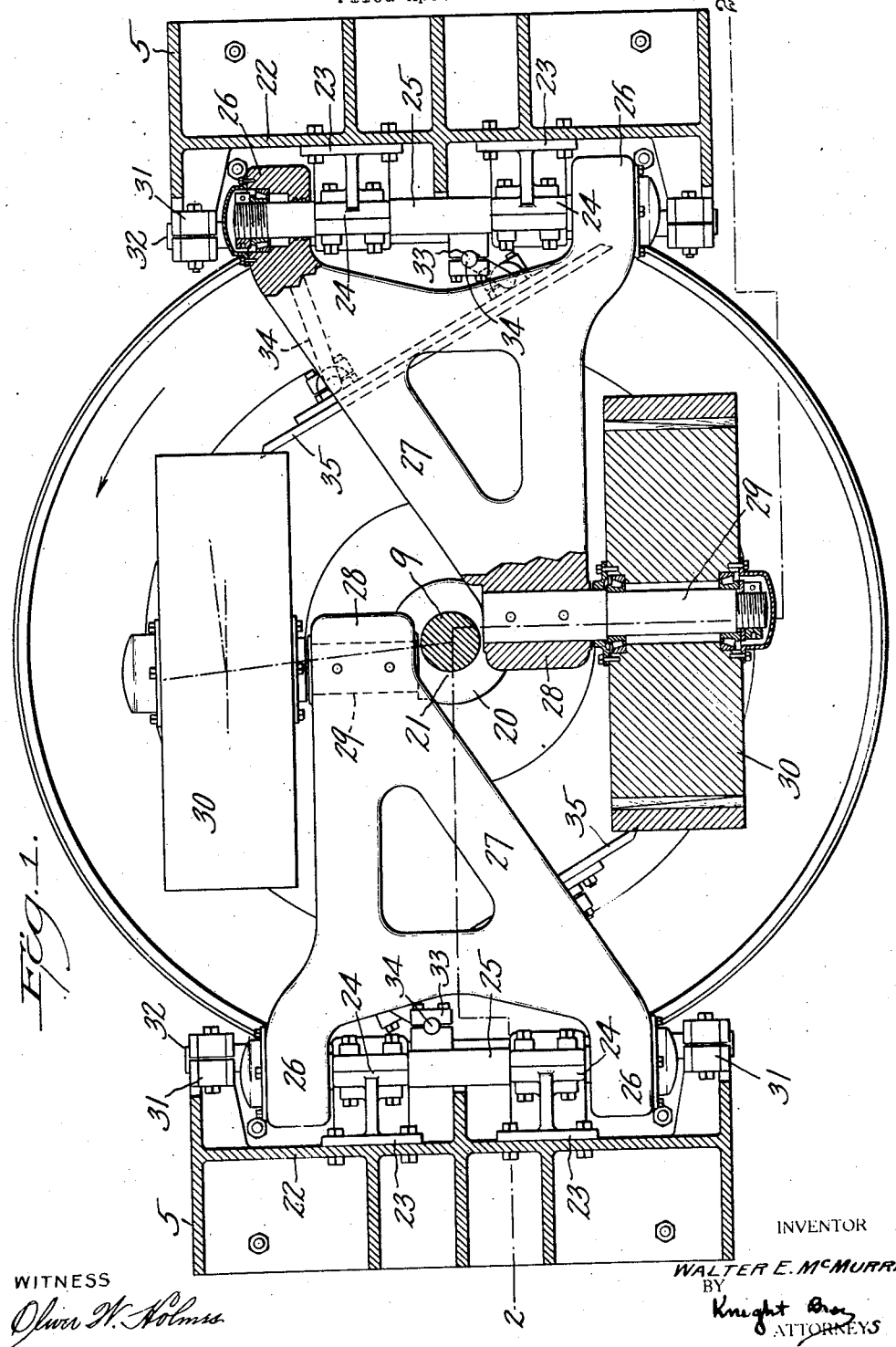
Figure 1 is an irregular horizontal section of the machine, parts being broken away and parts shown in plan.

In the embodiment of my invention shown in the drawings, a foundation 1 is suitably formed to provide a central pit 2, an annular shelf 3 extending around the pit 2, the upper surface 4 of said foundation being suitably arranged to receive the spaced upright frames 5. As shown in Figure 1, the frames 5 are symmetrically disposed with respect to a common vertical plane and are united above by a cross-piece or upper framework 6. Seated within the central pit 2 of the foundation, is a pedestal 7 for the support of a step bearing 8 within which is seated the lower end of a vertical rotary shaft 9, said shaft, as shown in Figure 1, having its axis disposed within the plane of symmetry of end frames 5, 5. The upper end of shaft 9 is journalled in a suitable bearing 10 within the cross-piece 6. Within a suitable housing 11 which surmounts the cross-piece 6 is a large bevel gear 12 which is keyed to the upper end of shaft 9 and is driven by a bevel pinion 13. As shown on the drawings, the bevel pinion 13 is integrally formed with a hollow shaft 14 to which is keyed a spur gear 15. The hollow shaft 14 is journalled upon a radial stationary shaft 16 which is supported at its inner end within a bearing lug 17, and at its outer end is carried by a bearing lug 18. It will be understood from this description that power delivered to the spur gear 15 is transmitted by hollow shaft 14 to bevel pinion 13 and thence by large bevel gear 12 to the rotary shaft 9.

Surmounting the step bearing 8 is a sleeve or collar 19 which serves to support the hub portion 20 of a revolving pan, said pan being thus supported independently of the rotary shaft 9 in such a way as to permit said shaft to be removed without disturbing the revolvable pan. A key 21 connects the hub 20 to the rotary shaft 9 for the purpose of rotating the pan.

As shown on the drawings, the spaced end frames or uprights 5, 5 are provided with inclined webs 22 to the inner surfaces of which are secured the base flanges 23 of laterally spaced bearings 24, said bearings being symmetrically disposed with respect to the plane of symmetry of said end frames. Mounted within the bearings 24 are oppositely disposed stationary shafts 25 upon the outer ends of which are oscillatably mounted the laterally spaced bearings 26 of two oppositely arranged triangular roll-supporting arms 27, the inner ends 28 of said arms being contracted and arranged on opposite sides of the rotary shaft 9 as shown best in Figure 1. Presented laterally in opposite directions from these inner ends are suitable pins or shafts 29 upon which are journalled the rolls 30. By an inspection of Figure 1, it will be seen that the axes of the pins 29, 29 as well as of the rolls 30, 30, are arranged in vertical transverse planes parallel to the axis of rotary shaft 9, but offset therefrom. By means of this construction and arrangement of parts, the line of running contact between each of the rolls 30 and the rotary pan, is angularly disposed with respect to the direction of movement of the pan surface passing said line.

Referring now to Figure 1, on each of the end frames 5 are mounted laterally spaced box-supports 31 which carry a transverse rod 32. Presented inwardly from the oppositely disposed rods 32 are suitable clamping brackets 33 for depending crank-arm supports 34 which adjustably support the scraper plates 35. As would appear from an inspection of Figure 2, the rod 32 and box-supports 33 are disposed below the pivotal axis of the roll-supporting arms 27, 27, and hence provide for a more rigid support of the scraper plates 35 than is possible in constructions where said scrapers are supported from a super-structure which overhangs the rotating rolls such as is common practice in the construction of machines of this character.

The advantages accruing to my improved construction will now be readily understood and briefly recited are as follows:

As compared to that type of machine in which the rolls are made to revolve about the axis of a rotating shaft which drives them, as well as in comparison to that type of machine in which the rolls are journalled in fixed planes below the cross-piece of the main frame, the height of frame may be made less where the rolls are mounted to rotate in fixed vertical planes at the sides of the cross-piece. Furthermore, this construction provides for a more rigid support for the scrapers and calls for a shorter and more rigid mounting of the vertical drive shaft. An absence of parts on the outer sides of the rolls also renders the screen plates more accessible and facilitates the replacement of tires and other repairs.

By the provision of only a single support for each roll-journalling pin and the arrangement of said pin to project outwardly therefrom also conduces to convenience in removing and replacing tires and furthermore exposes the roller bearings to dirt at only one point.

For neutralizing the tendency toward an outward displacement of the rolls from their pins or journals, the present construction provides for an angular displacement of the line of contact with the pan in which it runs with respect to the path of said pan as it approaches said line and at the same time applies the gyroscopic effects of the rotating roll in the plane of its vertical movement. As a result therefore, there is a reduction of wear of the roll bearings as well as a lessening of strain in the roll-supporting arm. In this connection may be mentioned the roughly triangular form of each roll-supporting arm in virtue of which an elongated bearing axis is provided for the relatively larger pivotally-supported end of said arm while the relatively smaller roll-carrying end is offset to one side of the vertical shaft with the journalling pin presented outwardly therefrom.

By providing a separate support for the rotary pan by means of a spacing collar interposed between it and the step-bearing within which the vertical shaft is mounted, said shaft is relieved from the weight of said pan while at the same time it is adapted to be readily removed without dismantling the machine.

I claim:

1. In a machine of the character described, the combination with a pan rotatable about a vertical axis, of roll-supporting arms pivotally-mounted on parallel axes transverse to a common plane including said vertical axis and having inwardly-presented contracted ends arranged on opposite sides of said plane, the pivotal bearings for each of said roll-supporting arms comprising bearing portions arranged on opposite sides of said plane, journal pins projecting laterally from the contracted inner ends of said roll-supporting arms and presented away from said plane, and rolls journaled on said pins and running in said pan.

2. In a machine of the character described, the combination with oppositely-presented upright frames transversely arranged and centrally disposed with respect to a common vertical plane, of a pan rotatable about a vertical axis lying within said plane and between said frames, substantially triangular roll-supporting arms having corresponding sides pivotally mounted on parallel axes and with the inwardly-presented apex-ends of said arms arranged on opposite sides of the vertical axis of said pan, the pivotal bearing of each of said triangular arms extending on opposite sides of said vertical plane, and rolls journaled in the apex-ends of said triangular arms and running in said pan.

3. In a machine of the character described, the combination with a vertical power driven shaft, of a pan keyed to said shaft, substantially triangular roll-supporting arms having oppositely presented sides pivoted on parallel axes transverse to a plane including the axis of said power shaft and having their contracted apex ends arranged on opposite sides of said plane with said power driven shaft interposed between the inner lateral faces of said contracted apex ends, and rolls journaled in the contracted apex ends of said triangular arms and running in said pan.

4. In a machine of the character described, the combination with oppositely-disposed upright frames, each of said frames being symmetrically arranged with respect to a common vertical plane, roll-supporting arms comprising substantially triangular frames, each of said roll supporting frames having axially-spaced bearings arranged on opposite sides of said common plane and a contracted outer end offset with respect to said plane, rolls journaled in said contracted outer ends of said frames, and a rotary pan within which said rolls operate.

5. In a machine of the character described, the combination with a grinding pan rotatable about a vertical axis, of oppositely disposed end frames, each of said end frames being symmetrically arranged with respect to a common plane including said axis, a roll-supporting arm pivotally mounted in each of said end-frames on an axis transverse to said plane, said roll-supporting arm being provided with axially-separated bearings arranged on opposite sides of said plane and with a contracted inner end offset to one side of said vertical axis and rolls journaled in said contracted inner ends of the roll-supporting arms.

6. In a machine of the character described, the combination with a vertically-disposed rotary shaft, of a grinding pan rotatable about the axis of said shaft, spaced end-frames transversely disposed with respect to a common plane of symmetry which includes the axis of said shaft, a cross-piece arranged longitudinally and centrally with respect to said plane to connect said end-frames, said cross-piece being provided with a bearing for said shaft, roll-supporting arms oscillatable in said end-frames on axes transverse to said plane, and rolls journaled in said arms and having their inner lateral faces arranged parallel to and laterally displaced from the vertical planes through the lateral edges of said cross-piece.

7. In a machine of the character described, the combination with a main frame, of a rotary shaft journaled on a vertical axis within said frame, a pan revolving with said shaft, vibratory arms having their outer ends pivotally mounted on parallel axes extending transversely to a plane including the vertical axis of said rotary shaft and their inner ends on opposite sides of said plane, and rolls rotatably mounted in the inner ends of said vibratory arms on axes parallel to the pivotal axes of said vibratory arms and respectively nearer to their corresponding pivotal axes than the vertical axis of said rotary shaft.

8. In a machine of the character described, the combination with a main frame, of a rotary shaft journaled on a vertical axis within said frame, a pan revolving with said shaft, oppositely-presented vibratory arms respectively having laterally-spaced pivotal bearings in said frame, the spaced pivotal bearings of each of said vibratory arms being arranged on opposite sides of a common vertical plane including the axis of said shaft, each of said arms being provided with a contracted free end laterally-displaced from said plane and on the opposite side thereof with respect to the contracted free end of the other vibratory arm, oppositely and outwardly presented roll journaling pins mounted in the free ends of said vibratory arms, and rolls journaled on said pins.

9. In a machine of the character described, the combination with spaced upright frames, of a rotary shaft journalled on a vertical axis between said upright frames, said upright frames being symmetrically disposed with respect to a plane including said axis, a rotary pan coaxial with and driven by said shaft, roll-supporting arms provided with bifurcated bearings at their outer ends in said upright frames and having their free ends arranged on opposite sides of said rotary shaft, roll-supporting shafts mounted in the inner ends of said arms and presented away from said axis, and rolls journalled on said shafts, the axes of said rolls being nearer to the pivotal axes of their respective supporting arms.

10. In a machine of the character described, the combination with spaced upright frames, of a rotary shaft journalled on a vertical axis, a rotary pan coaxial with and driven by said shaft, roll-supporting arms pivotally-mounted at their outer ends in said upright frames and having their respective free ends offset on opposite sides of said rotary shaft, roll-supporting pins mounted in the inner ends of said arms and presented away from said shaft, rolls journalled on said pins, and a cross-piece extending across the tops of said upright frames between the inner faces of said rolls.

11. In a machine of the character described, the combination with spaced upright frames, of a rotary shaft journalled on a vertical axis between said frame, a rotary pan coaxial with and driven by said shaft, roll-supporting arms pivotally-mounted at their outer ends in said upright frames and having their inner free ends arranged on opposite sides of said shaft, pins supported at one end in said inner free ends of said roll-supporting arms, said pins being presented outwardly away from said shaft, rolls journalled on said pins, and a cross-piece extending between the inner faces of said rolls and connecting the upright frames.

12. In a machine of the character described, the combination with spaced upright frames, of a cross-piece extending between said upright frames, a rotary shaft journalled on a vertical axis within said cross-piece, a rotary pan coaxial with and driven by said shaft, roll-supporting arms pivotally mounted at their outer ends in said upright frames and having their free ends arranged on opposite sides of said vertical axis, roll-journalling pins presented outwardly from the inner ends of said arms, and rolls journalled on said shafts, said pins being suitably disposed to arrange the inner sides of said rolls in planes beyond the outer limits of said cross-piece.

13. In a machine of the character described, the combination with a vertical rotary shaft, of bearings for said shaft, a pan rotated by said shaft, roll-supporting arms mounted on fixed horizontal axes distant from said shaft, said arms being provided with contracted inner ends arranged on opposite sides of said shaft, roll-journalling pins presented outwardly from the inner ends of said arms, and rolls journalled on said pins.

WALTER EARL McMURRAY.